US008167605B2

(12) United States Patent
Linares

(10) Patent No.: US 8,167,605 B2
(45) Date of Patent: May 1, 2012

(54) PRODUCTION ASSEMBLY AND PROCESS FOR MASS MANUFACTURE OF A THERMOPLASTIC PALLET INCORPORATING A STIFFENED INSERT

(75) Inventor: Miguel Linares, Bloomfield Hills, MI (US)

(73) Assignee: Oria Collapsibles, LLC, Auburn Hills, MI (US)

( * ) Notice: Subject to any disclaimer, the term of this patent is extended or adjusted under 35 U.S.C. 154(b) by 173 days.

(21) Appl. No.: 12/463,047

(22) Filed: May 8, 2009

(65) Prior Publication Data
US 2009/0315210 A1    Dec. 24, 2009

Related U.S. Application Data

(60) Provisional application No. 61/074,306, filed on Jun. 20, 2008.

(51) Int. Cl.
*B29C 45/14* (2006.01)
(52) U.S. Cl. ....... 425/451; 425/99; 425/125; 425/126.1; 425/259; 425/450.1
(58) Field of Classification Search ................... 425/110, 425/116, 117, 120, 121, 122, 123, 126.1, 425/127, 129.1, 130, 134, 253, 254, 255, 425/256, 257, 258, 259, 261, 364 R, 370, 425/371, 377, 394, 397, 403.1, 412, 413, 425/414, 447, 449, 451, 452, 453, 454, 75, 425/125
See application file for complete search history.

(56) References Cited

U.S. PATENT DOCUMENTS

| | | | | |
|---|---|---|---|---|
| 1,557,935 A | * | 10/1925 | Henroz | 425/134 |
| 2,383,736 A | * | 8/1945 | Rembert et al. | 264/37.28 |
| 2,477,852 A | | 8/1949 | Bacon | |
| 2,709,559 A | | 5/1955 | Geisler | |
| 2,913,206 A | | 11/1959 | Paris | |
| 2,914,282 A | | 11/1959 | Budd | |
| 3,002,249 A | * | 10/1961 | Jackson | 425/195 |
| 3,157,910 A | * | 11/1964 | Schlipphak | 425/254 |
| 3,223,379 A | * | 12/1965 | Erickson | 425/111 |
| 3,226,764 A | * | 1/1966 | Hostettler | 425/80.1 |

(Continued)

FOREIGN PATENT DOCUMENTS
JP    02139341 A    5/1990
(Continued)

*Primary Examiner* — Joseph Del Sole
*Assistant Examiner* — Seyed Masoud Malekzadeh
(74) *Attorney, Agent, or Firm* — Gifford, Krass, Sprinkle, Anderson & Citkowski, P.C.

(57) ABSTRACT

An assembly and related process for mass producing a resin coated article including an input line transporting a plurality of inserts and an output line removing the resin coated articles. One or more mold supporting and closed loop conveyor lines extend between the input and output lines, the conveyor line including a mold assembly line and an empty mold return line. A first lift and transfer mechanism communicates between the input line and mold assembly line for collecting, in succession, an insert and an upper mold half for installation with a lower mold half supported upon the assembly line. A mixing and dispensing station communicates with each mold in succession to fill an interior thereof with a viscous and curable resin material. A second lift and transfer mechanism is communicable between the mold assembly line and output line for removing the finished articles from the mold and depositing upon the output line, concurrent with redirecting the empty mold halves along return lines for redelivery to said mold assembly line.

11 Claims, 15 Drawing Sheets

U.S. PATENT DOCUMENTS

| | | | |
|---|---|---|---|
| 3,310,616 A * | 3/1967 | Beary | 264/46.5 |
| 3,382,550 A * | 5/1968 | Smith et al. | 425/163 |
| 3,412,439 A * | 11/1968 | Baker | 414/421 |
| 3,416,203 A * | 12/1968 | Ozenne et al. | 425/96 |
| 3,448,496 A * | 6/1969 | Van Dyke et al. | 425/167 |
| 3,556,886 A | 1/1971 | Reusser | |
| 3,568,912 A | 3/1971 | de Simas | |
| 3,580,190 A | 5/1971 | Fowler | |
| 3,587,479 A | 6/1971 | Geschwender | |
| 3,590,446 A * | 7/1971 | Sonneville | 425/125 |
| 3,659,986 A * | 5/1972 | Gelbman | 425/88 |
| 3,675,595 A | 7/1972 | Sullivan | |
| 3,710,733 A | 1/1973 | Story | |
| 3,719,157 A | 3/1973 | Arcocha et al. | |
| 3,720,176 A | 3/1973 | Munroe | |
| 3,724,979 A * | 4/1973 | Maringer et al. | 425/88 |
| 3,733,157 A * | 5/1973 | Hendry | 425/149 |
| 3,801,255 A * | 4/1974 | Meyer et al. | 425/147 |
| 3,814,778 A | 6/1974 | Hosoda et al. | |
| 3,859,021 A * | 1/1975 | Kleiber | 425/186 |
| 3,873,257 A * | 3/1975 | Vanotti | 425/112 |
| 3,897,186 A * | 7/1975 | Farfor | 425/85 |
| 3,920,369 A * | 11/1975 | Boehringer et al. | 425/253 |
| 3,942,926 A * | 3/1976 | Bulloch, Jr. | 425/126.1 |
| 3,955,613 A | 5/1976 | Lund | |
| 3,981,956 A * | 9/1976 | Redmer et al. | 264/275 |
| 3,982,057 A | 9/1976 | Briggs et al. | |
| 3,982,874 A * | 9/1976 | Nobbe | 425/424 |
| 3,989,090 A * | 11/1976 | Kawai | 164/228 |
| 4,063,864 A * | 12/1977 | Oberwelland et al. | 425/433 |
| 4,068,993 A * | 1/1978 | Dacey et al. | 425/104 |
| 4,105,383 A * | 8/1978 | Hanson | 425/96 |
| 4,197,065 A * | 4/1980 | Di Rosa | 425/34.3 |
| 4,220,100 A | 9/1980 | Palomo et al. | |
| 4,279,583 A * | 7/1981 | Martin, Sr. | 425/253 |
| 4,369,024 A * | 1/1983 | Blackwood et al. | 425/112 |
| 4,413,964 A * | 11/1983 | Winstead | 425/66 |
| 4,456,449 A * | 6/1984 | Schubert et al. | 425/253 |
| 4,507,348 A | 3/1985 | Nagata et al. | |
| 4,597,338 A | 7/1986 | Kreeger | |
| 4,611,978 A * | 9/1986 | Sangiorgi | 425/73 |
| 4,715,294 A | 12/1987 | Depew | |
| 4,758,148 A * | 7/1988 | Jidell | 425/219 |
| 4,802,836 A * | 2/1989 | Whissell | 425/253 |
| 4,819,449 A * | 4/1989 | Curti et al. | 62/345 |
| 4,829,909 A | 5/1989 | Mandel | |
| 4,832,587 A * | 5/1989 | Rensen | 425/99 |
| 4,836,762 A * | 6/1989 | Davis, Jr. | 425/89 |
| 4,923,661 A * | 5/1990 | Russo | 264/119 |
| 5,023,037 A * | 6/1991 | Zullig | 264/261 |
| 5,032,072 A * | 7/1991 | Heuschkel | 425/150 |
| 5,035,594 A * | 7/1991 | Murayama et al. | 425/116 |
| 5,076,176 A | 12/1991 | Clasen | |
| 5,080,840 A * | 1/1992 | Jost et al. | 264/40.1 |
| 5,082,712 A | 1/1992 | Starp | |
| 5,143,778 A | 9/1992 | Shuert | |
| 5,160,689 A * | 11/1992 | Kamen | 264/297.8 |
| 5,171,586 A * | 12/1992 | Heath | 425/404 |
| 5,205,221 A | 4/1993 | Melin et al. | |
| 5,290,165 A * | 3/1994 | Pitha | 425/150 |
| 5,304,050 A * | 4/1994 | Vismara | 425/4 R |
| 5,320,048 A | 6/1994 | Feiner | |
| 5,365,858 A | 11/1994 | Kuhns | |
| 5,368,466 A * | 11/1994 | Hehl | 425/556 |
| 5,382,152 A * | 1/1995 | Ravera | 425/397 |
| 5,391,387 A * | 2/1995 | Peters | 426/512 |
| 5,395,227 A * | 3/1995 | Huggins et al. | 425/145 |
| 5,401,456 A | 3/1995 | Alesi, Jr. et al. | |
| 5,445,514 A * | 8/1995 | Heitz | 425/255 |
| 5,451,157 A * | 9/1995 | Gimenez | 425/302.1 |
| 5,476,048 A | 12/1995 | Yamashita et al. | |
| 5,551,353 A | 9/1996 | Fiedler | |
| 5,605,102 A | 2/1997 | Simpson | |
| 5,612,064 A * | 3/1997 | Kosman | 425/255 |
| 5,687,652 A * | 11/1997 | Ruma | 108/57.25 |
| 5,846,576 A * | 12/1998 | Braungardt et al. | 425/253 |
| 5,868,080 A | 2/1999 | Wyler et al. | |
| 6,093,011 A * | 7/2000 | Kosman | 425/253 |
| 6,209,464 B1 | 4/2001 | Elder | |
| 6,224,363 B1 * | 5/2001 | Mahan et al. | 425/126.1 |
| 6,294,114 B1 | 9/2001 | Muirhead | |
| 6,357,366 B1 | 3/2002 | Frankenberg | |
| 6,530,330 B2 | 3/2003 | Sepe et al. | |
| 6,530,769 B1 * | 3/2003 | Rondeau et al. | 425/186 |
| 6,569,509 B1 | 5/2003 | Alts | |
| 6,582,216 B2 * | 6/2003 | Kosman | 425/183 |
| 6,655,299 B2 | 12/2003 | Preisler et al. | |
| 6,705,237 B2 | 3/2004 | Moore, Jr. et al. | |
| 6,719,551 B2 * | 4/2004 | Polk, Jr. | 425/126.1 |
| 6,755,633 B2 * | 6/2004 | Miller | 425/64 |
| 6,817,857 B2 * | 11/2004 | Spangenberg et al. | 425/254 |
| 6,900,547 B2 * | 5/2005 | Polk, Jr. et al. | 257/777 |
| 6,976,437 B2 | 12/2005 | Fisch et al. | |
| 7,013,814 B2 | 3/2006 | Modesitt et al. | |
| 7,143,564 B2 | 12/2006 | Renck | |
| 7,150,621 B2 * | 12/2006 | Molin | 425/261 |
| 7,197,989 B2 | 4/2007 | Apps | |
| 7,255,551 B2 * | 8/2007 | Taylor et al. | 425/253 |
| 7,309,226 B2 * | 12/2007 | Hansen et al. | 425/255 |
| 7,458,800 B2 * | 12/2008 | Scherer et al. | 425/413 |
| 7,658,958 B2 * | 2/2010 | Hansen | 426/279 |
| 7,726,248 B2 | 6/2010 | Shuert | |
| 7,804,400 B2 | 9/2010 | Muirhead | |
| 7,819,068 B2 | 10/2010 | Apps et al. | |
| 2002/0106483 A1 | 8/2002 | Obeshaw | |
| 2003/0118681 A1 * | 6/2003 | Dahl et al. | 425/126.1 |
| 2003/0201561 A1 * | 10/2003 | Linares | 264/69 |
| 2005/0211139 A1 | 9/2005 | Perrotta et al. | |
| 2006/0003044 A1 | 1/2006 | DiNello et al. | |
| 2006/0075939 A1 | 4/2006 | Shuert | |
| 2006/0130712 A1 | 6/2006 | Wang | |
| 2006/0131773 A1 * | 6/2006 | Linares et al. | 264/46.4 |
| 2006/0134254 A1 * | 6/2006 | Hansen et al. | 425/255 |
| 2006/0201402 A1 | 9/2006 | Moore et al. | |
| 2006/0235780 A1 | 10/2006 | Carney | |
| 2008/0053596 A1 | 3/2008 | Davies et al. | |
| 2008/0196633 A1 | 8/2008 | Ho | |
| 2010/0154685 A1 | 6/2010 | Arinstein | |

FOREIGN PATENT DOCUMENTS

| | | |
|---|---|---|
| JP | 03029744 A | 2/1991 |
| JP | 06156493 A | 6/1994 |
| JP | 06-235780 A | 8/1994 |
| JP | 08034014 A | 2/1996 |
| JP | 08034438 A | 2/1996 |
| JP | 08336866 A | 12/1996 |
| JP | 11079180 A | 3/1999 |
| JP | 11221828 | 8/1999 |
| JP | 2002166940 A | 6/2002 |
| JP | 2003011969 A | 1/2003 |
| JP | 2004090988 A | 3/2004 |
| JP | 2005104562 A | 4/2005 |
| JP | 2006036315 A | 2/2006 |
| JP | 2006036331 A | 2/2006 |
| JP | 2006298403 A | 11/2006 |
| JP | 2008023741 A | 2/2008 |
| JP | 2008087839 A | 4/2008 |
| KR | 20030034370 A | 5/2003 |
| KR | 10-0577441 | 5/2006 |
| KR | 1020090117107 | 11/2009 |

* cited by examiner

US 8,167,605 B2

PRODUCTION ASSEMBLY AND PROCESS FOR MASS MANUFACTURE OF A THERMOPLASTIC PALLET INCORPORATING A STIFFENED INSERT

CROSS-REFERENCE TO RELATED APPLICATIONS

This Application claims the benefit of U.S. Provisional Application 61/074,306 filed on Jun. 20, 2008.

FIELD OF THE INVENTION

The present invention is directed to the production assemblies for creating a reinforced pallet exhibiting a resin exterior encasing an inner rigid core. More specifically, the present invention discloses a production assembly and associated process for mass producing such a thermoplastic pallet utilizing an interconnected network of conveyors for transporting reinforcing and core positioned inserts, as well as upper and lower assemble-able mold halves within which the inserts are placed concurrent with filling the mold interior with a two part resin and hardener and in order to create a finished pallet.

BACKGROUND OF THE INVENTION

The prior art is well documented with examples of plasticized or resinous based pallet constructions. In each case, the pallet construction includes some form of reinforcement or support, around and/or over which is applied a synthetic composition. A shortcoming of the prior art is the ability to produce the pallets in volumes satisfactory for demand.

SUMMARY OF THE INVENTION

The present invention discloses an assembly and related process for mass producing a resin coated pallet and includes an input line upon which is transported a plurality of rigid and planar shaped inserts, as well as an output line a spaced relationship from the input line for removing the resin coated articles. A plurality of mold supporting and closed loop conveyor lines extend between the input and output lines, each of the conveyor lines includes a mold assembly line along with first and second upper and lower mold half return lines.

A first lift and transfer mechanism is positioned in overhead extending fashion between the upper mold half return line, the input line and the mold assembly line. The lift and transfer mechanism includes an underside projecting carriage which collects, in succession, an upper mold half and an underside and spatially supported insert for subsequent installation upon a lower mold half separately redirected to the assembly line from the lower mold half return lines.

A mixing and dispensing station is located at the mold assembly line and communicates with each mold in succession to fill an interior thereof with a viscous and curable resin material. A first variant includes a pair of injection ports for depositing a two part resin and hardener within an open interior of the lower mold half and prior to compression assembly of the upper mold half and underside supported insert by the first lift and transfer mechanism. A second variant includes a pair of resin injection ports communicating with an open interior defined within the previously assembled upper and lower mold halves with inter-disposed insert and for injecting the two part resin and hardener. In each instance, the assembly process at this point results in equal distribution and adhering application of the curable/settable resin matrix relative to the upper and lower surfaces of the interiorly secured/supported insert.

The assembled and filled molds are allowed to set and cure while be conveyed at a selected speed (and optional cure temperature) along the mold assembly line. Upon completion, a second lift and transfer mechanism is communicable between an output located end of the mold assembly line, the output line and the upper mold half return line. The second lift and transfer mechanism likewise includes an underside projecting carriage which removes the upper mold half supporting the resin coated pallet, deposits the completed pallet upon the output line, and finally deposits the upper mold half to a feed location of the upper mold half return line. Concurrently, the lower mold is redirected by a first lift from the assembly line to the lower mold half return line and, once rerouted to a feed location of the assembly line, is communicated thereto via a further lift and concurrent re-feed of the upper mold halves with additional inserts.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Referring now to FIGS. 1-8 in succession, a series of views are shown of a compression mold assembly for producing a resin coated article according to a first embodiment. As will be discussed in further detail, the present invention enables mass production of resin coated articles, such as pallets or the like, and which is not available with current production methods and techniques.

Referring again to FIG. 1 an overhead illustration is generally shown of the assembly which illustrates a plurality of four conveyor (also assembly) lines, generally represented at 10, 12, 14 and 16, these each further including a generally closed loop conveyor with individual assembly and return lines (as will be further described) and which are networked with a common core insert supply line 18 and completed pallet output line 20. The present invention contemplate incorporating any number of individual conveyor lines, such as again shown at 10-16 and which also contemplates adding new conveyor lines as well as selective activation and deactivation of one or more existing lines in order to scale up or down the desired volume of completed resin coated products (e.g. resin coated pallets). Although not further shown, it is understood that appropriate control and processer capabilities are incorporated into the overall assembly, and which synchronize the transport speed and operation of the supply line 18, output line 20 and inter-disposed conveyor/assembly lines 10-16, as well as the associated lift and transport mechanisms and resin injection sub-systems utilized in the successive assembly of the articles described herein.

Figure 1:
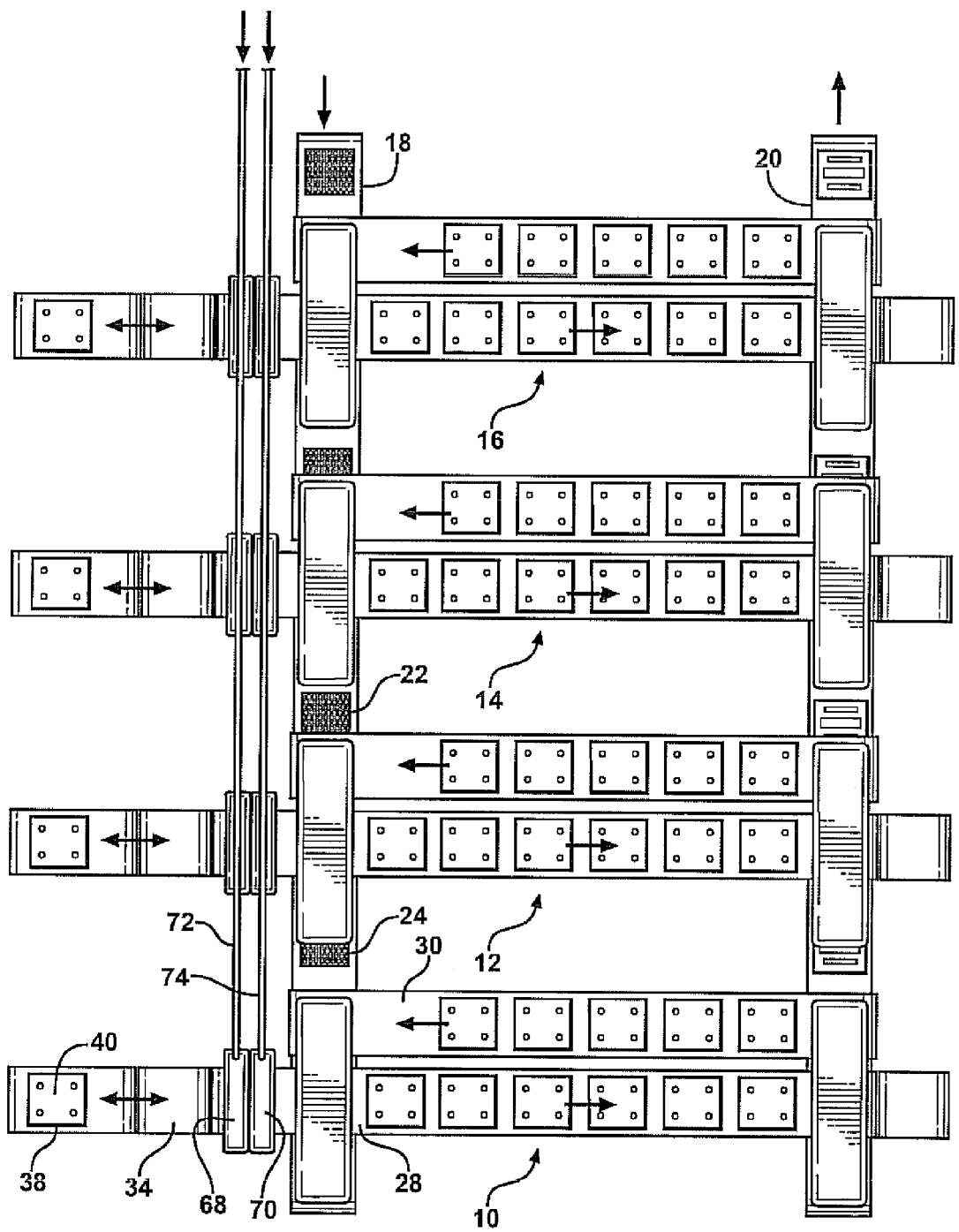
FIG. 1 is an overhead illustration of a plurality of four closed loop and continuous conveyor lines networked by a common core insert supply line and completed pallet output line according to a compression molding operation associated with a first embodiment of the present inventions.
Figure 2:
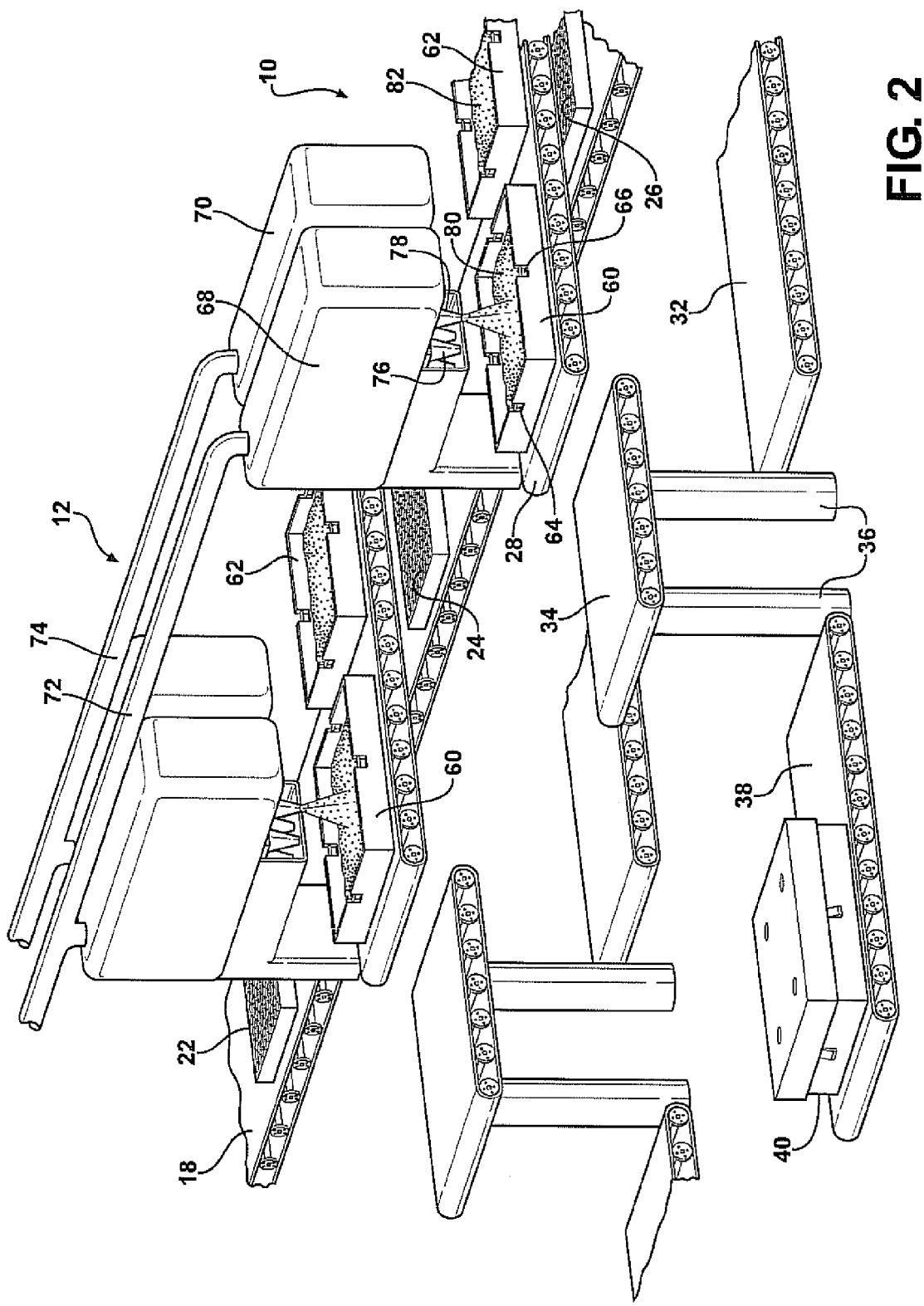
FIG. 2 is a sectional perspective of an input side of a pair of the conveyor lines and further illustrating the assembling arrangement of the core insert supply line in relation to the upper combined assembly/cure line with two-part resin injection filling each lower mold half, along with an underneath spaced and mold half return line with input side lift communicating with an inlet end of the assembly line.

Referring further to FIGS. 2-5 in combination with FIG. 1, an inlet end and mold assembly protocol is illustrated for quickly and effectively assembling a succession of molds within each conveyor line. While the partial perspective of FIG. 2 illustrates the first and second conveyor assembly lines 10 and 12, FIGS. 3-5 successively illustrate aspects involving only the first selected conveyor line 10, this for purposes of ease of illustration and to avoid the necessity of duplicative references to the same features associated with each of the conveyor lines 10-16.

As shown, the core insert supply line 18 is illustrated as a first belt driven and roller supported conveyor and upon which are supported a plurality of evenly spaced apart inserts 22, 24, 26, et, seq. Without further description, the inserts 22, 24, 26, et. seq. correspond to any rigid substrate material which can be incorporated into a resin coated, over-molded or injection formed article and which provide the features of durability and reinforcement.

The inserts are generally planar shaped, with a given thickness and, as further shown, can exhibit a desired honeycombed or otherwise apertured design between upper and lower faces thereof. In one non-limiting application, the inserts can be constructed of a rigid paperboard or particle board material and which, when coated with the desired composite resin, provides an extremely durable, weight and weather resistant article including most notably a resin coated pallet. That said, the assembly and process is contemplated to also encompass the manufacture of any resin coated article not limited to a pallet and including any form of wall board, flooring or other item which benefits from the incorporation of a permanent and interior insert or spine, combined with a mold assembly process including the assembly of upper and lower mold halves about the insert and into which is admitted a curable/settable resin matrix.

Figure 4:
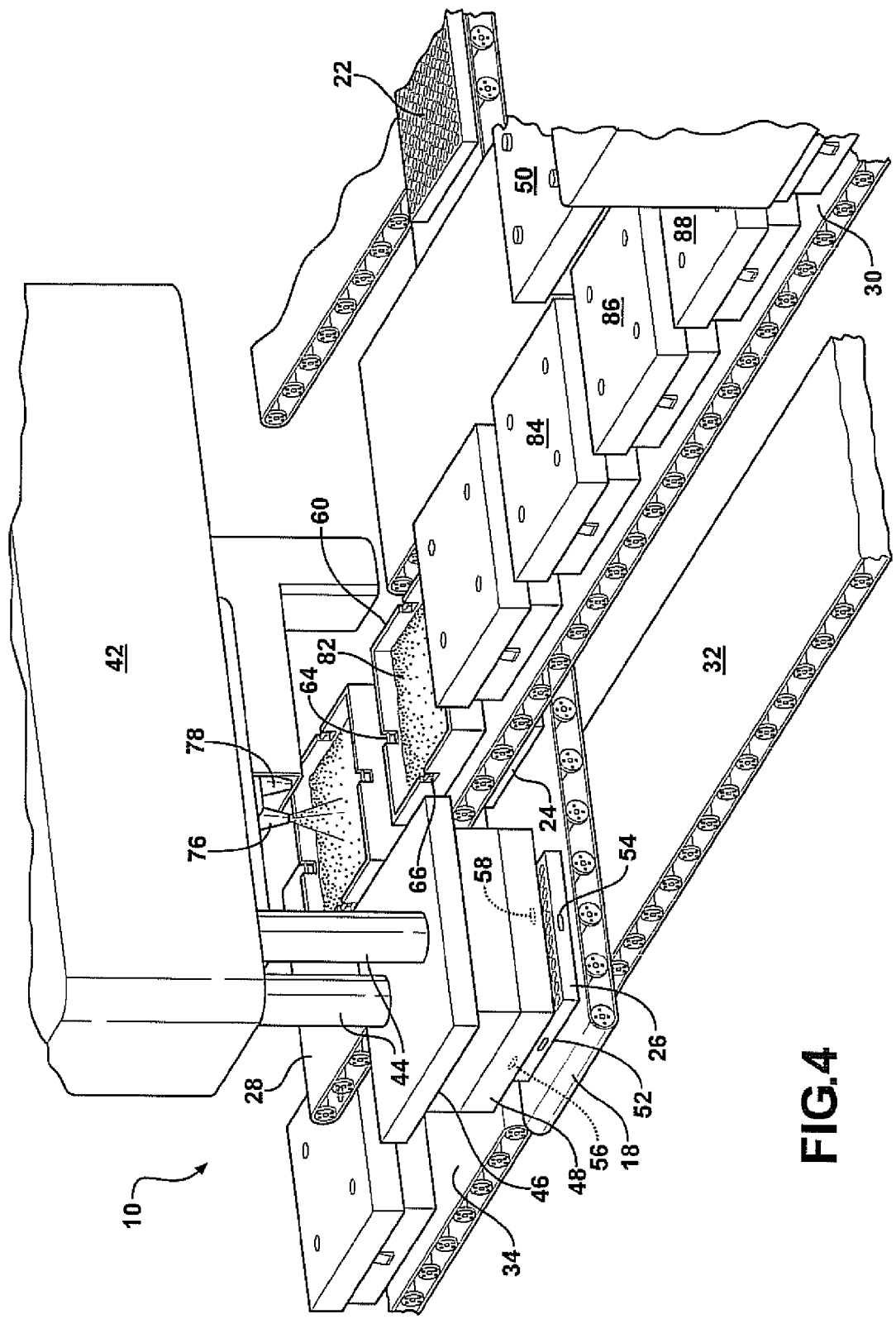
FIG. 4 is a succeeding illustration of the lift and transfer mechanism with an upper mold half repositioned over a core insert at a specified location supported upon the insert supply line.
Figure 5:
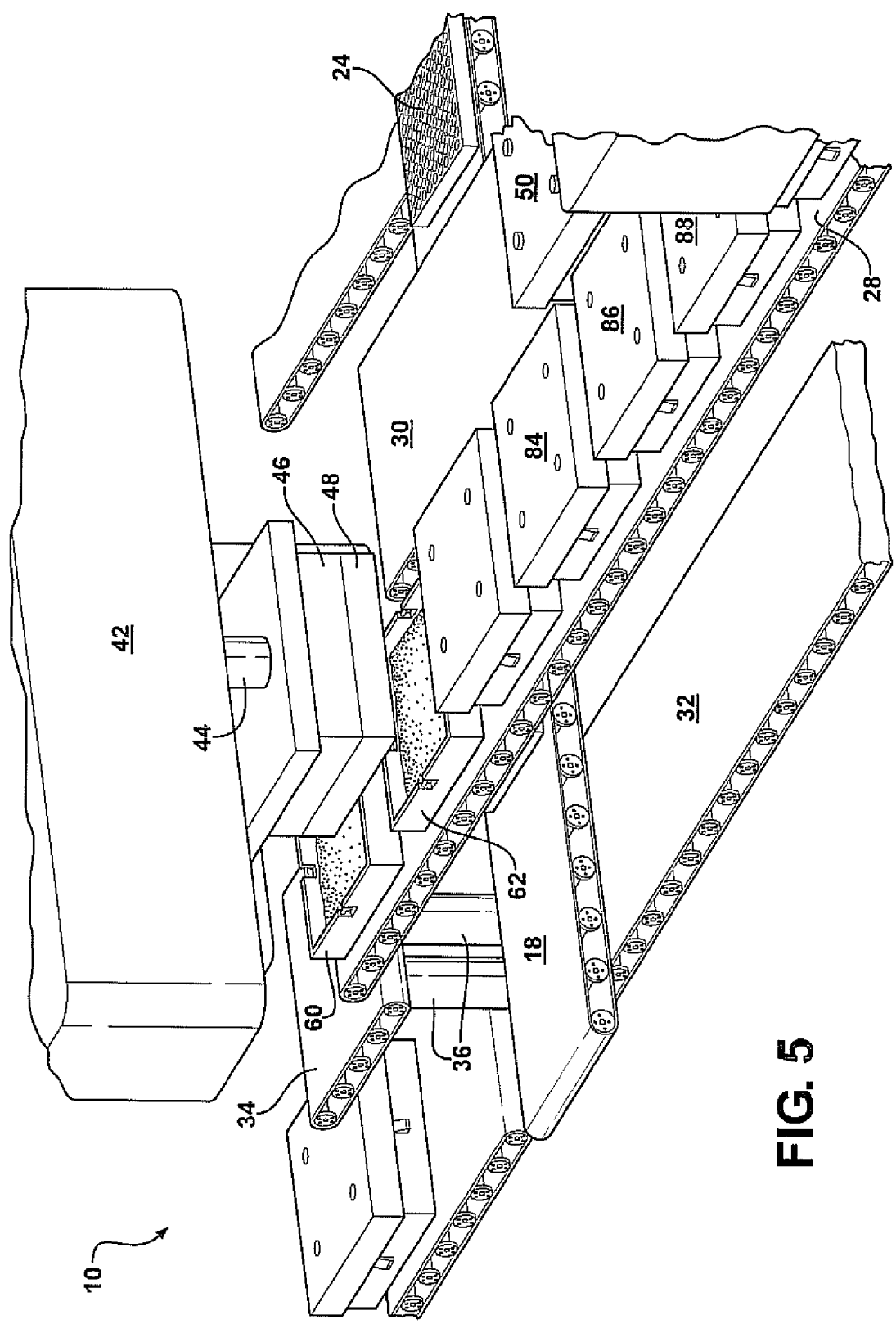
FIG. 5 is a further succeeding illustration in which the peripheral edge clip locations associated with the insert are engaged in underside supporting and spatially positioned fashion within the upper mold half interior, such as by corresponding engaging clips defined upon inner recessed side edges associated with the upper mold half, the lift and transfer mechanism being further transferred to an overhead position associated with a lower mold half pre-filled with a specified volume of the two part resin soup and prior to final assembly of the upper and lower mold halves, such as via additional side latching locations established therebetween.
Figure 6:
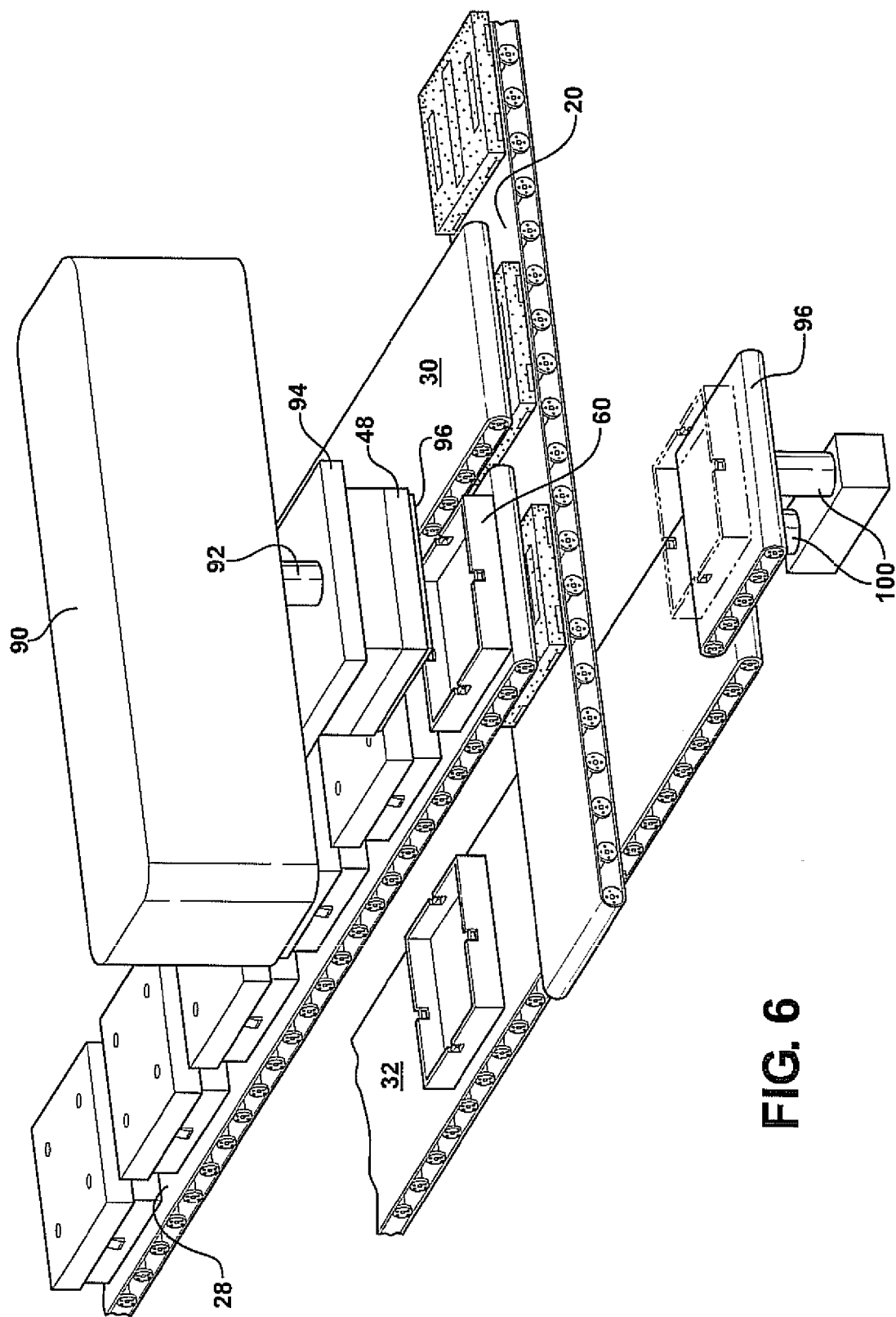
FIG. 6 is an environment illustration of the combination mold assembly and cure line at an output end location and illustrating an output side lift and transfer mechanism for unlatching and lift removing the upper mold half with cured pallet.
Figure 7:
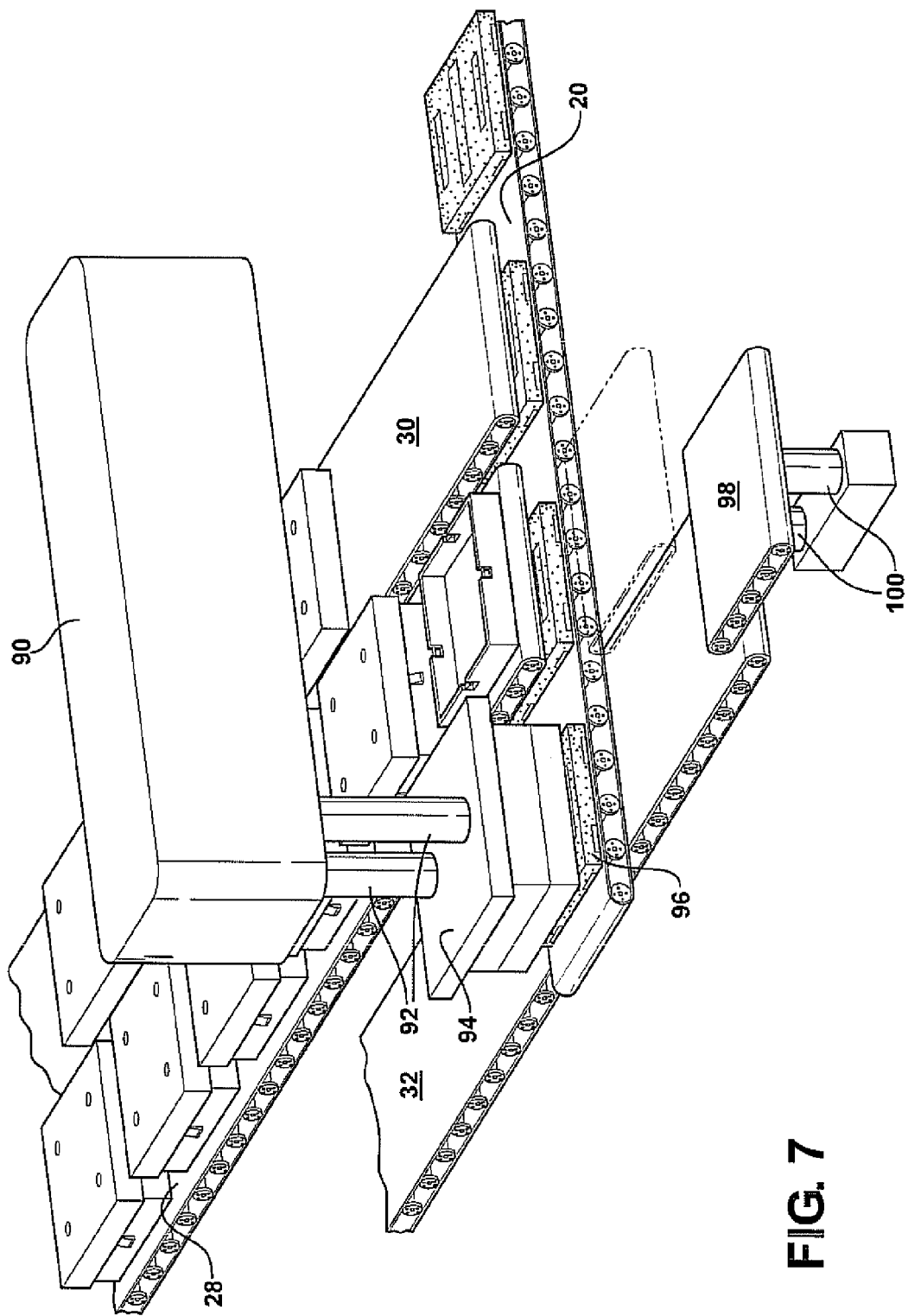
FIG. 7 is a succeeding illustration to that shown in FIG. 6 and by which output lift and transfer mechanism deposits a completed pallet upon the output line.
Figure 8:
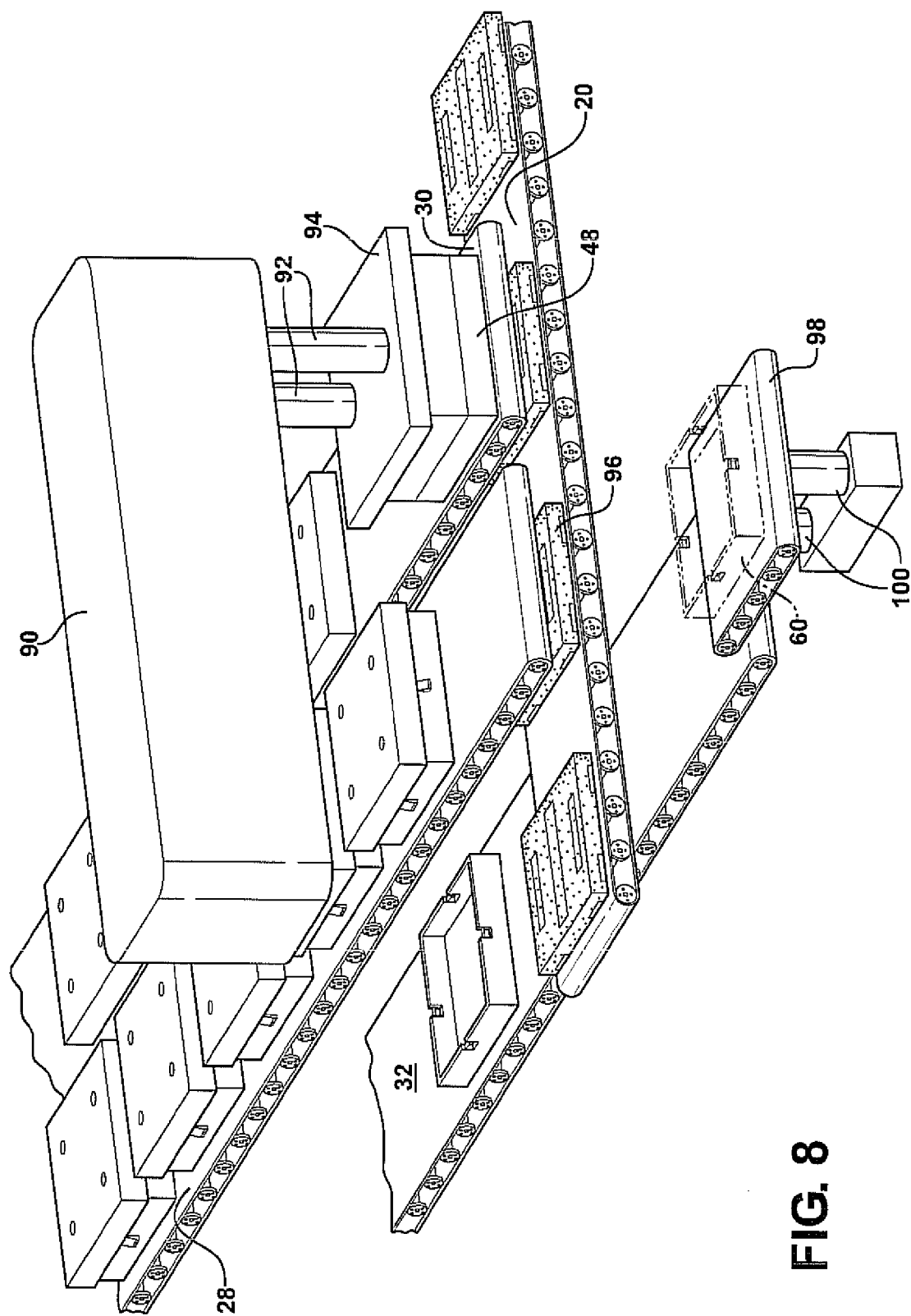
FIG. 8 is a further succeeding illustration of the output lift and transfer mechanism depositing the upper mold half upon an initial position associated with the upper mold half return line concurrent with the lower mold half being redirected to its associated return line via an output side positioned lift.
Figure 9:
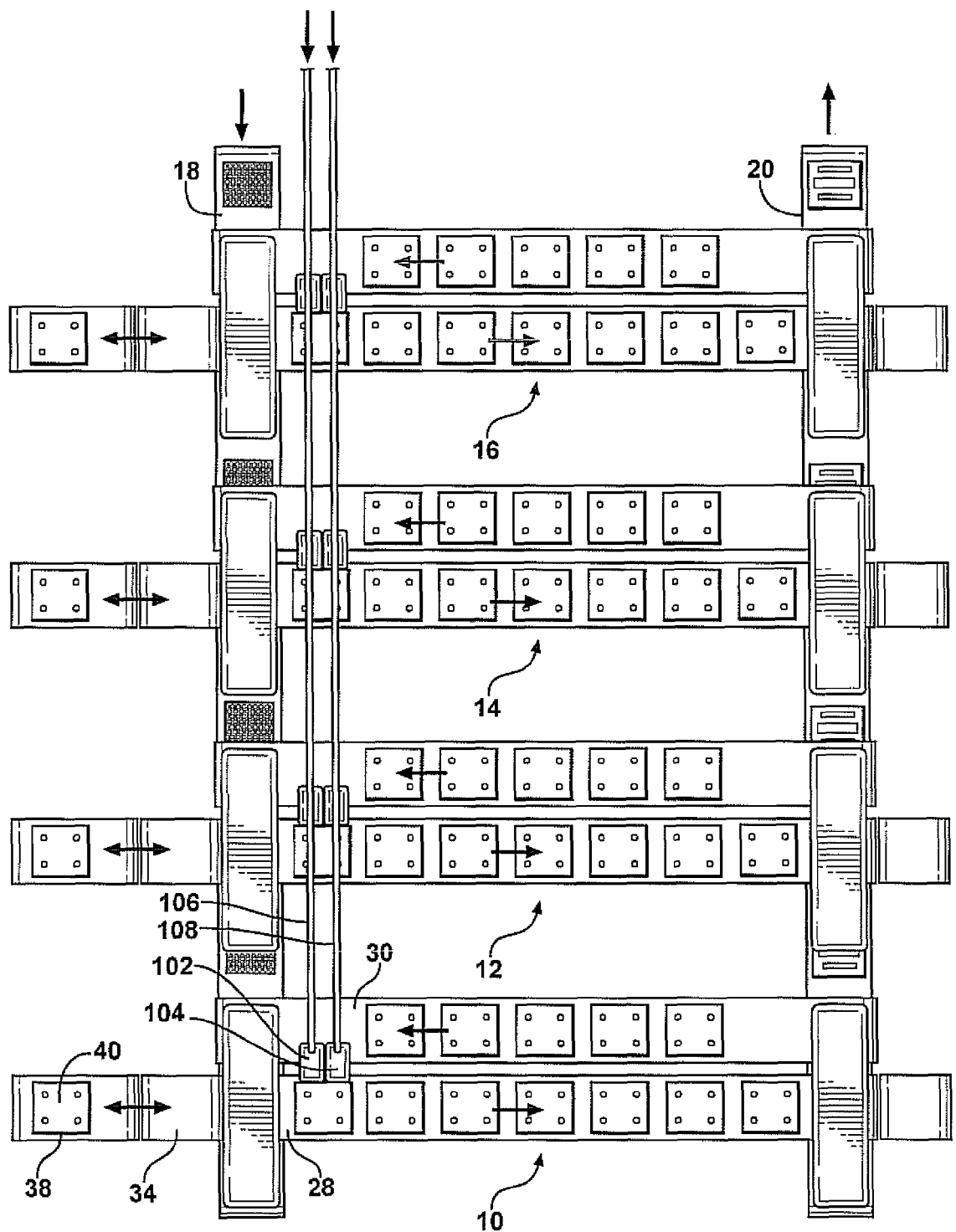
FIG. 9 is an overhead illustration of a plurality of four conveyor lines networked by a common core insert supply line and completed pallet output line according to a low pressure injection assembly line operation in a second embodiment of the present inventions.

With further reference again to only the initial conveyor/assembly line 10, subset conveyor lines include the provision of a main assembly line 28, an upper mold half return line 30, and a lower mold half return line 32 (this being positioned underneath the main assembly line 28 and hidden from FIG. 1 but shown in each of FIGS. 2-5 as well as along with the assembly line 28 and upper mold half return line 30 in each of the outlet end illustrations of FIGS. 6-8). Additional features associated with the inlet side of the closed loop and assembly conveyor 10 include the provision of an input side lift (this including a smaller belt driven conveyor 34 supported upon a displaceable pair of hydraulic lift cylinders 36 and vertically movable between a lower position in communication with a receiving end from the lower mold half return line 32 and an upper position in communication with a delivery location of the main assembly line 28.

Also shown at 38 is a mold maintenance and repair line, this spaced a distance from the receiving end of the lower mold half return line 32 and between which the input lift conveyor 34 communicates in its lower position in order to deliver a faulty mold or portion thereof (see as shown at 40) and which may be in need of maintenance. This provides the ability to remove a faulty mold from the conveyor line without the need for interrupting its ongoing operation.

Figure 3:
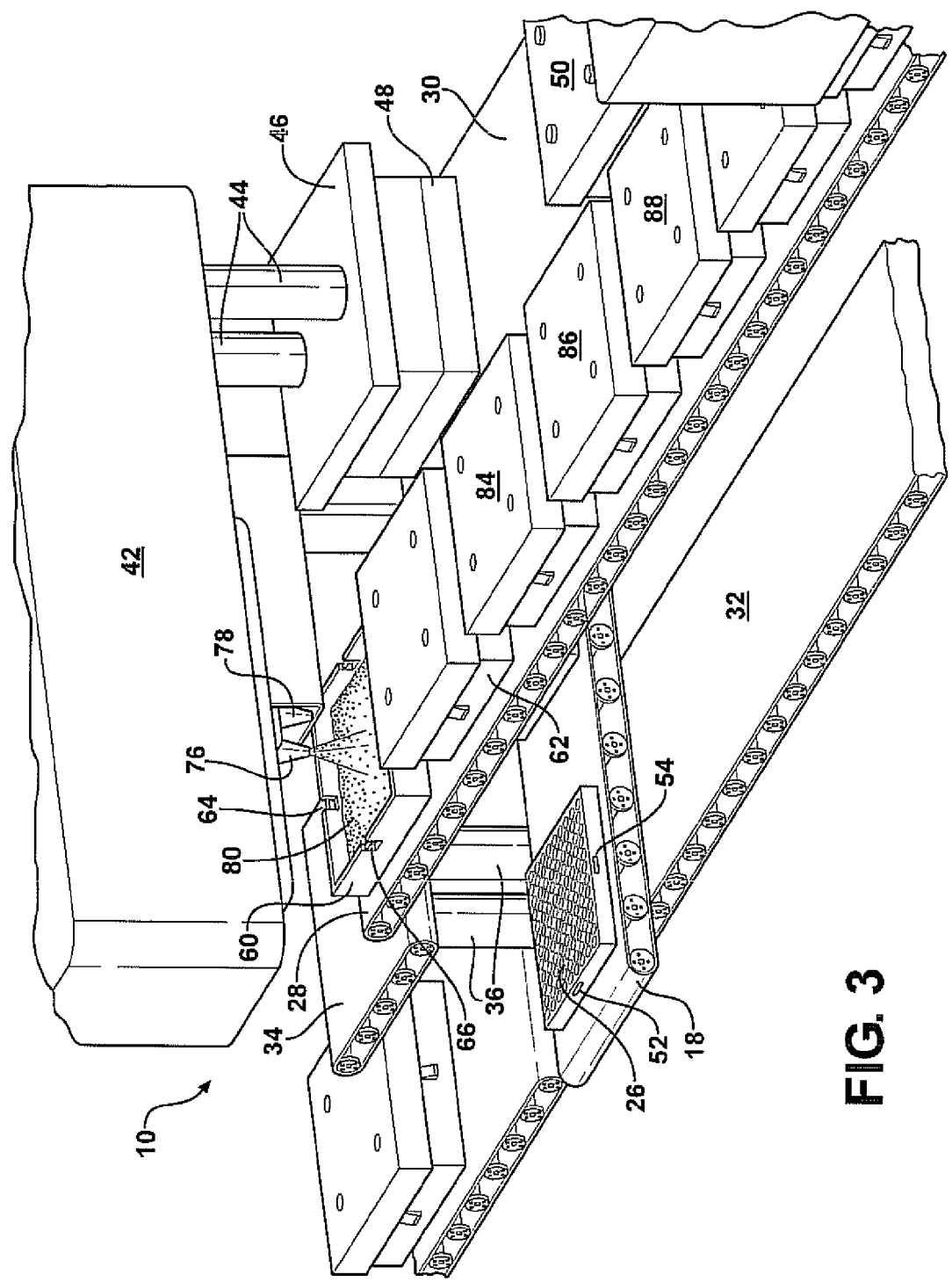
FIG. 3 is a further rotated perspective view of a single conveyor line and better illustrating both the lower mold half return line as well as an upper mold half return line which is communicated by an inlet side lift and transfer mechanism for selecting and transferring the upper mold halves in successive fashion.

Referring to FIGS. 3-5 in succession, a first lift and transfer mechanism 42 is provided and which is positioned in overhead fashion (typically parallel to the input line 18), and which extends between the upper mold half return line 30, an accessible location of the input line 18, and an intermediate position associated with the mold assembly line 28. As, shown, the lift and transfer mechanism 42 includes an underside projecting and displaceable carriage, see spaced apart hydraulic supports 44, to an end of which is mounted a downwardly facing platen 46.

In operation, the lift and transfer mechanism 42 is displaced (such as again by the use of known external processor control technology utilized in synchronization with the speed and feed direction of each of the interconnecting network of conveyors) to a first position in which the downwardly facing platen 46 is extended via the associated drive cylinders 44 in order to engage a selected upper mold half 48 situated upon the upper mold half return line 30 and advanced to a generally forward most location in alignment with the running direction of the article supporting input line 18. A succeeding upper mold half is shown at 50 located a upstream (returning) distance from the acquisition positioned upper mold half 48 (see again FIGS. 3-5) and it is understood that a continuous plurality of upper mold halves 48, 50, et. seq., are provided in spatially fed fashion along the upper mold return line 30.

Along with the lower mold halves, the upper mold halves 48, 50, et seq. are constructed of a durable and typically square or rectangular shape construction with determined thickness and when, assembled together, define an interior recessed configuration generally matching a negative recess of the article to be produced. As shown in FIG. 3, the platen 46 of the first lift and transfer mechanism 42 is engaged with a top of the upper mold half 48, this occurring through a combination of any of vacuum suction, mechanical fastening or the like and which permits the platen 46 and interconnected upper mold half 48 to be subsequently transported.

Referring to FIG. 4, the lift and transfer platen 46 with selected adhered and downwardly facing upper mold half 48 is repositioned over previously referenced (core) insert 26 and which has been transported to a specified and exposed location supported upon the insert supply line 18. At this point, the associated hydraulic carriage cylinders 44 and extended and the platen supported upper mold half 48 is caused to descend in aligning and overlapping/seating fashion relative to the outline perimeter of the selected core insert 26.

A plurality of clips, such as representatively shown at 52 and 54 and as best shown in FIGS. 4 and 5, are arranged at peripheral edge locations associated with the insert 26, these corresponding with additional clips (see as shown in phantom at 56 and 58 in FIG. 4) associated with inner facing side walls of the upper mold half 48. Upon downwardly displacing the upper mold half 48 around and over the insert 26, the opposing sets of clips interengage in order to retain the insert in an underside supporting and spatially positioned fashion within the upper mold half.

Concurrent to the initial upper mold half and insert acquisition steps accomplished by the lift and transfer mechanism 42, a series of lower mold halves, see at 60, 62, et. seq. in each of FIGS. 2-5, are located upon the conveyor assembly line 28. As previously described, the lower mold halves are successively re-delivered to an inlet end of the main conveyor 28 via the inlet end positioned lift conveyor 34 traveling between the underneath extending lower mold half return line 32 and the upper positioned feed/assembly line 28.

The lower mold halves 60, 62, et seq. each include side latching locations, see as shown at 64 and 66 for selected mold 60 in FIG. 2 and which are disposed along upper edges of its sides. Also shown in FIG. 2, and to a lesser extend in FIGS. 3 and 4, is a mixing and dispensing station for providing a two part (or other composite) resin mixture within the open facing lower mold halves, and prior to subsequent assembly of the upper mold halves and associated inserts.

In the embodiment illustrated, the dispensing station includes a first resin dispensing station 68 and a side situated second resin dispensing station 70. Each of the dispensing stations 68 and 70 are communicated by a common resin feed line, see further as shown at 72 and 74, and which extends in generally parallel fashion to the input line 18 for communicating two part resin and hardener components in viscous form to associated assembly stations corresponding to each of the lines 10-16 illustrated (see also again FIG. 1). As further shown, a pair of injection ports 76 and 78 deposit a mixed viscous volume of two part resin mixture within each of the lower mold half open interiors, this further shown by resin volume 80 deposited into lower mold half 60 and separate volume 82 deposited into lower mold half 62.

Referring now to FIG. 5, the first lift and transfer supporting platen 46 with underside supported upper mold half 48 and interiorly/spatially positioned insert (hidden at 26) is repositioned to a final installation position in which it overlays the lower mold half 60 which has been concurrently loaded onto the main assembly conveyor 28, advanced to the resin mixing and dispensing stations 68 and 70 (FIGS. 3-4), filled with the two part viscous resin mixture 80, and then advanced (FIG. 5) to a location at which the downward motion of the platen 46 results in the upper mold half 48 and insert 26 being engaged (such as by the side latching locations associated with the lower mold halves) to fully assemble the mold in a fashion so that the interiorly positioned insert is supported in a generally centralized fashion. The final downward motion of the platen 46 further occurs with a significant enough degree of force resulting in the previously deposited volume of resin to fully and evenly distribute throughout the interior of the mold around the upper and lower surfaces of the insert (as well as through its honeycombed interior) and so that the insert is fully encapsulated.

At this point, the succession of fully assembled molds, see as shown at 84, 86, 88 et. seq., are continuously transported along the main assembly line 28 during which the two part resin hardens and cures within the mold and around the insert. Although not shown, it is understood and envisioned that an additional heat chamber or the like can be employed in order to facilitate the curing and setting of the resin, this dependent upon the parameters associated with the resin components used.

Referring to FIGS. 6-8, a further subset series of illustrations are shown of an outlet side of the main conveyor 28 and include a downstream positioned and second lift and transfer mechanism 90 and which is communicable between an output located end of the mold assembly line 28, the output line 20 and the upper mold half return line 30. The second lift and transfer mechanism 90 likewise includes an underside projecting carriage actuated by hydraulic cylinders 92 and which supports a downward facing platen 94. As with the first lift and transfer mechanism 42, the second mechanism 90 is displaceable both linearly and vertically and, in a first position, removes a selected upper mold half (by example again at 48) and underneath which is supported a finished and resin coated pallet 96. Although not shown, appropriate unlatching/disengagement structure can be employed and to ensure clean separation of the upper and lower mold halves 48 and 60.

The platen 94 is then displaced to a position consistent with FIG. 7, at which it deposits the completed pallet 96 upon the output line 20 and, finally, deposits the upper mold half 48 to a feed location of the upper mold half return line 30. Concurrently, the lower mold (shown in phantom at 60 in FIG. 8) is redirected by an outlet end position lift conveyor 98 with underside actuating cylinders 100 from the outlet end of the assembly line 28 for delivery to a downstream and input location of the lower mold half return line 32. At this point, and once rerouted to a feed location of the assembly line 28, the lower mold halves are successively reloaded in the fashion previously described and concurrent re-feed of the upper mold halves with additional inserts.

Referring to FIGS. 9-15 in combination a similar arrangement to that shown in FIGS. 1-8 is provided for an injection molded operation for filling a pre-assembled interior of a mold with the two part resin and hardener. Accordingly, and with the exception of the modification to the mixing and dispensing station described herein, all remaining elements are identical to those illustrated and described in FIGS. 1-8, including the operation of the various assembly and return conveyors, the assembly protocol for each mold, and manner in which each disassembled mold is rerouted back to the inlet end of the conveyor line concurrent with the placement of the finished resin article (again at 96) upon the output line 20. As such, all identical features are repetitively numbered without additional elaboration.

Figure 10:
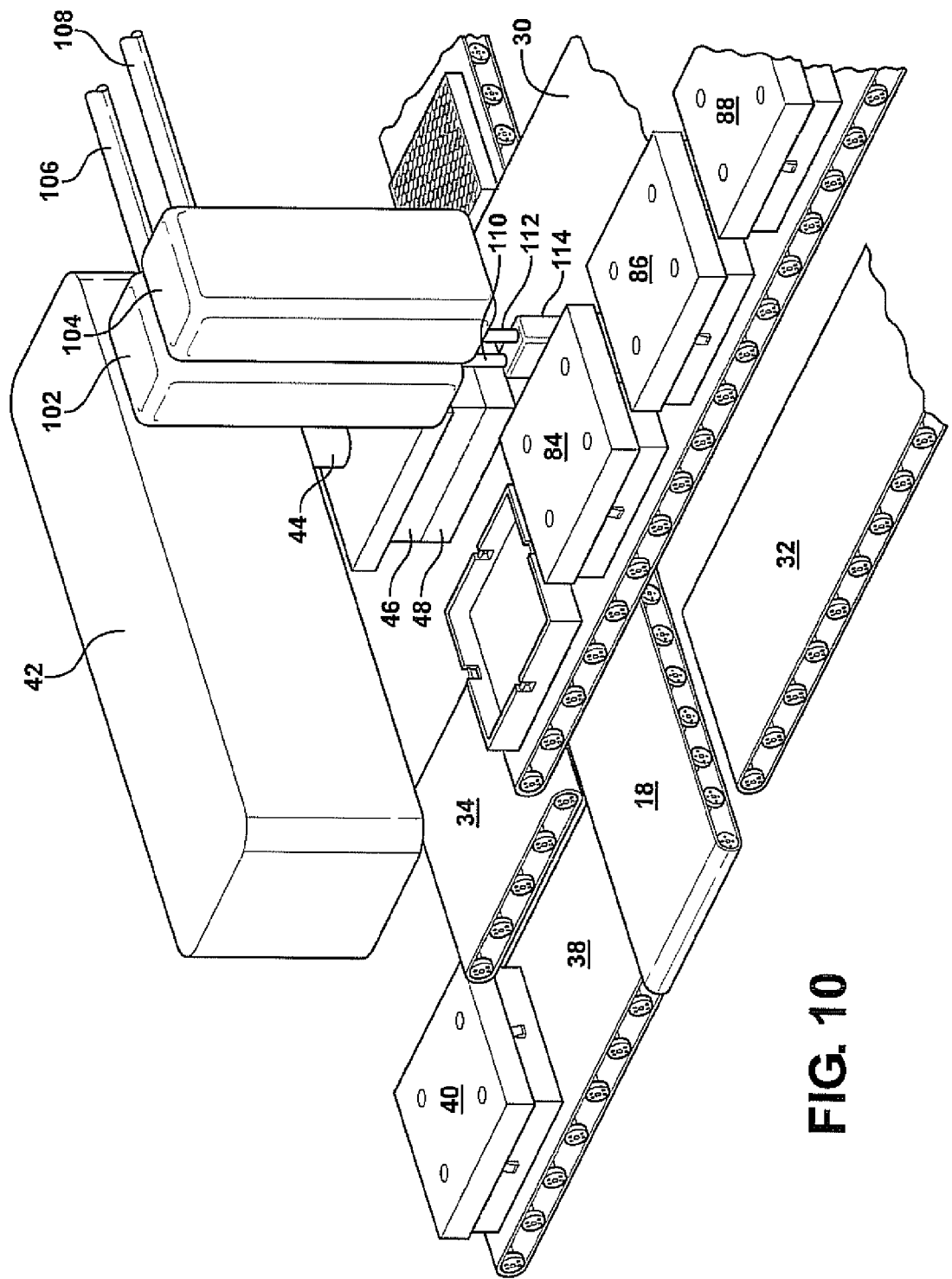
FIG. 10 is a rotated perspective of a selected conveyor line and illustrating a lower mold half return line as well as an upper mold half return line which is communicated by an inlet side lift and transfer mechanism for selecting and transferring the upper mold halves in successive fashion concurrent with an input side lift elevating the lower mold halves in coordinated fashion for re-feed to an assembly line.
Figure 11:
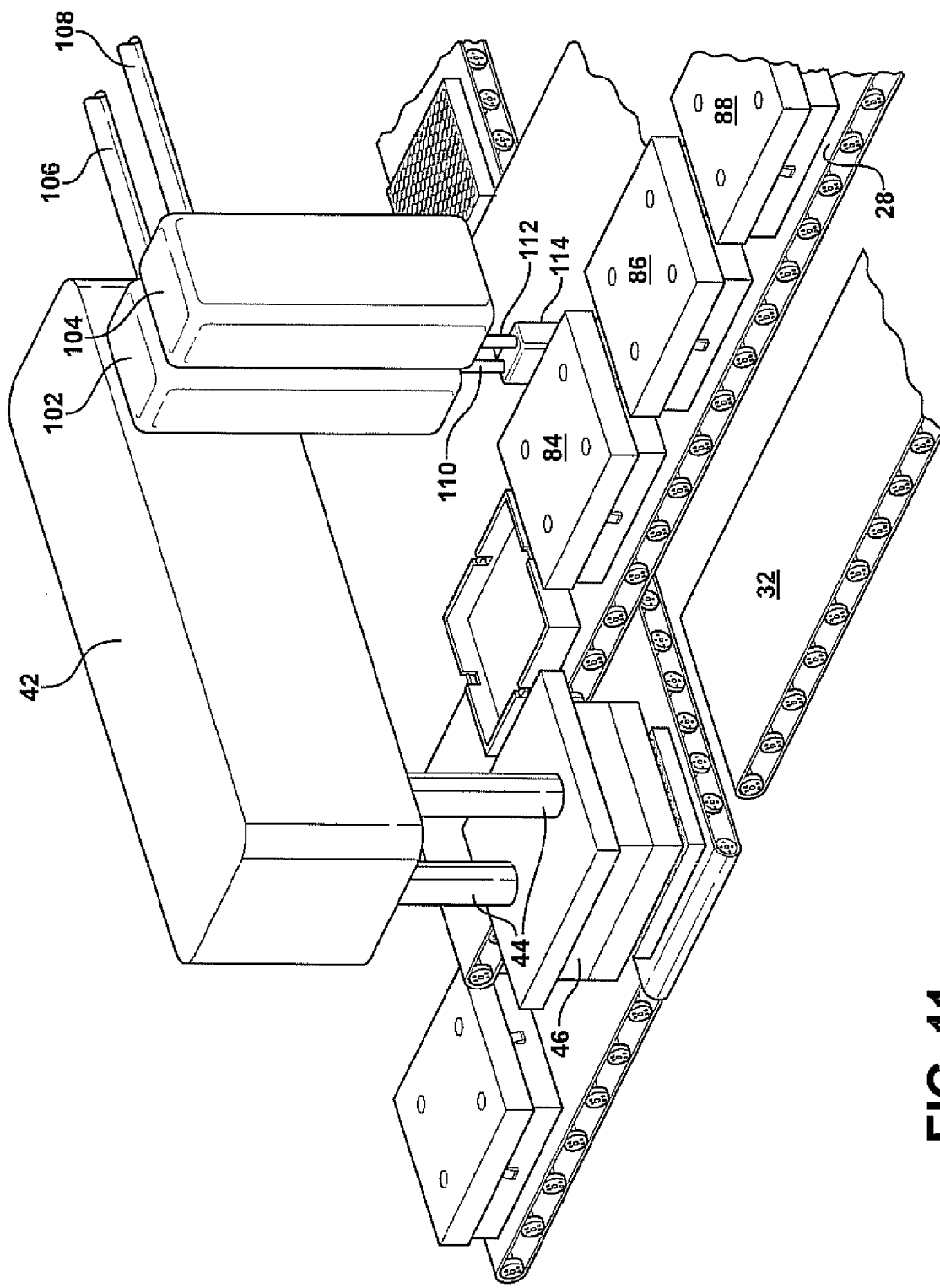
FIG. 11 is a succeeding illustration of the lift and transfer mechanism in FIG. 10 with an upper mold half repositioned over a core insert at a specified location supported upon the insert supply line.
Figure 12:
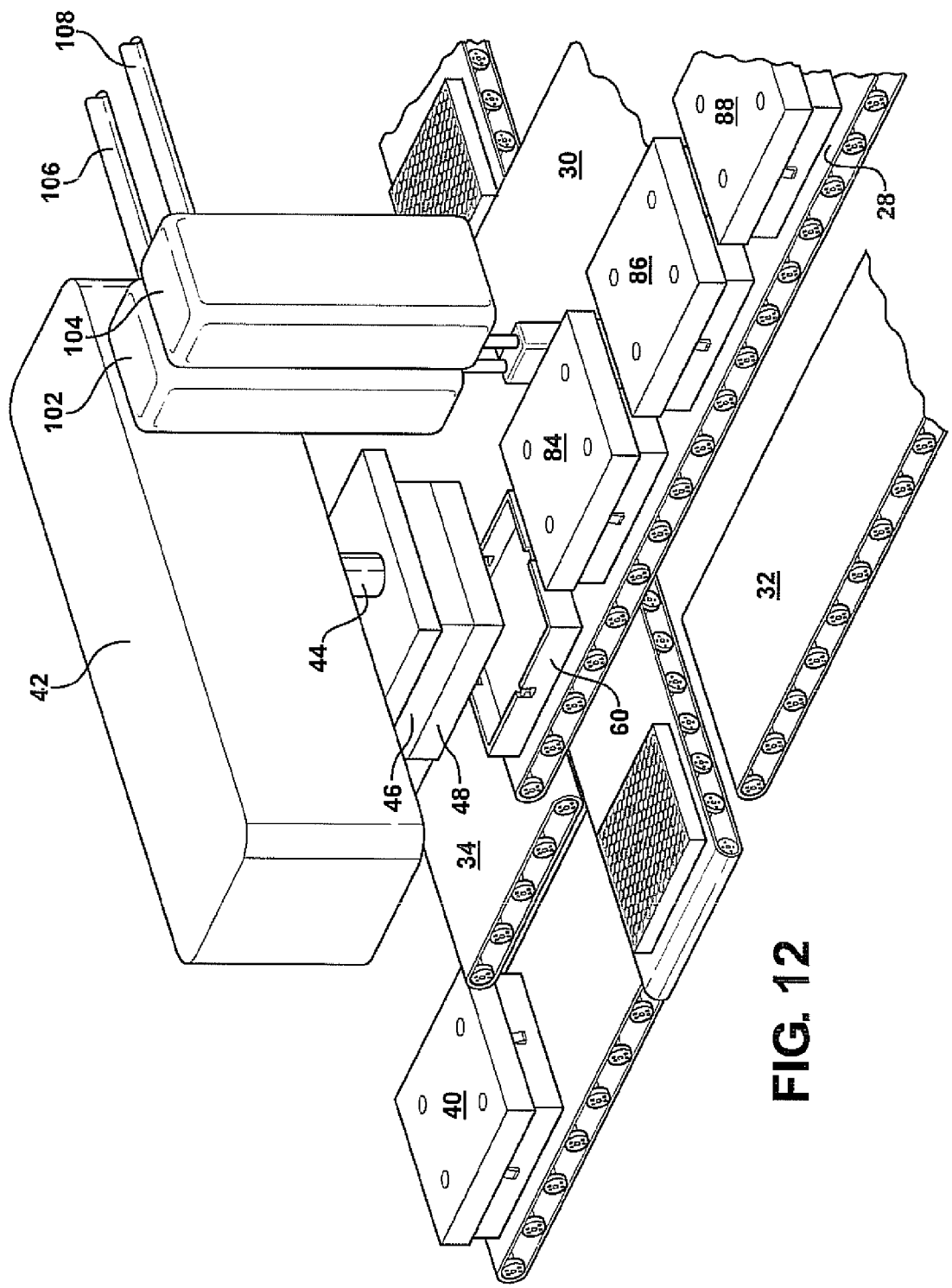
FIG. 12 is a further succeeding illustration in which the peripheral edge clip locations associated with the insert are engaged in underside supporting and spatially positioned fashion within the top mold half interior, such as by corresponding engaging clips defined upon inner recessed side edges associated with the top mold half, the lift and transfer mechanism being further transferred to an overhead position associated with an empty lower mold half and successively assembling the upper and lower mold halves, such as via additional side latching locations established between and such that the insert is inwardly and spatially suspended, the assembled mold interior subsequently being injected with a volume of the two part resin soup.
Figure 13:
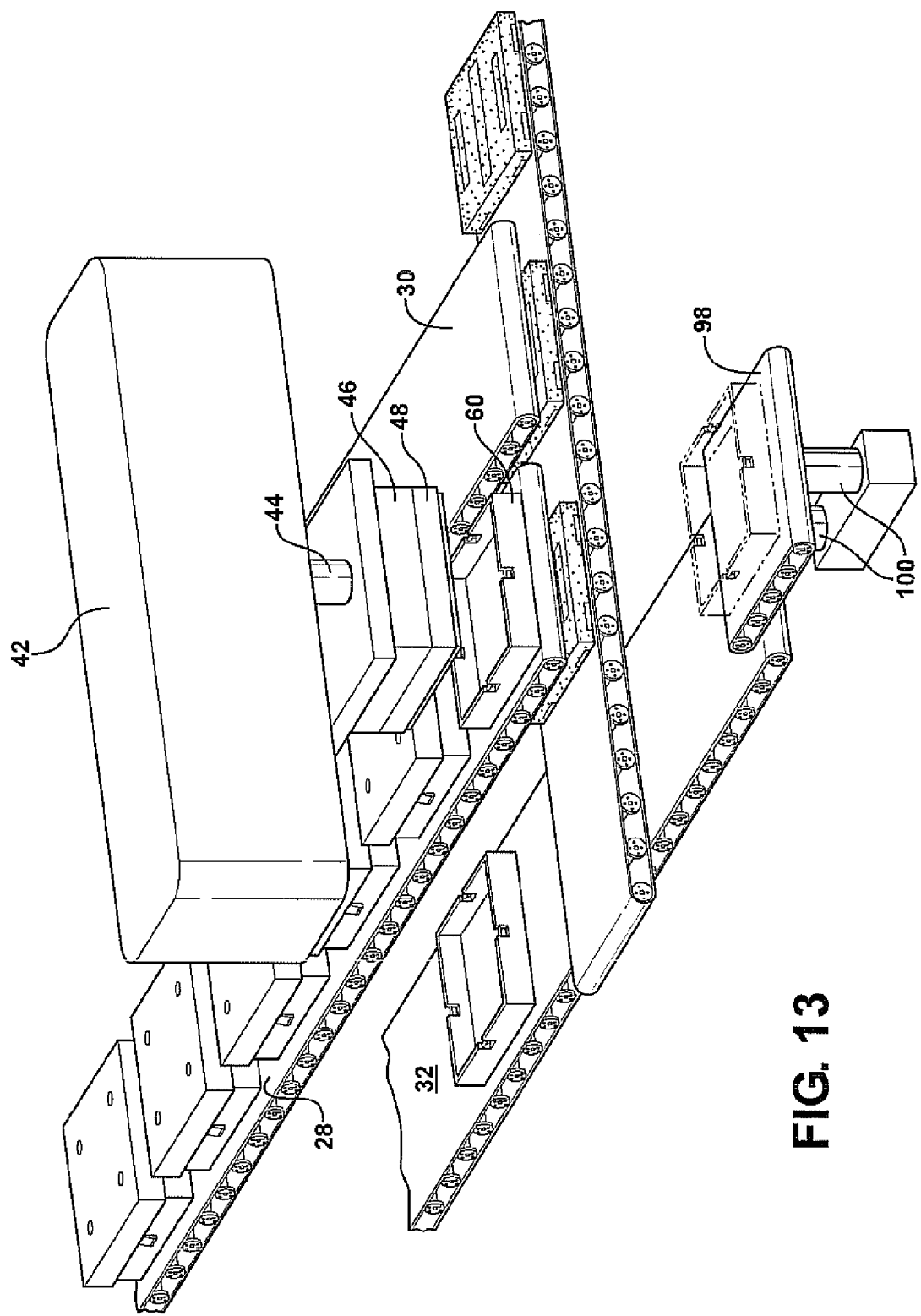
FIG. 13 is an environment illustration of the combination mold assembly and cure line according to the embodiment of FIG. 9 at an output end location and illustrating an output side lift and transfer mechanism for unlatching and lift removing the upper mold half with cured pallet.
Figure 14:
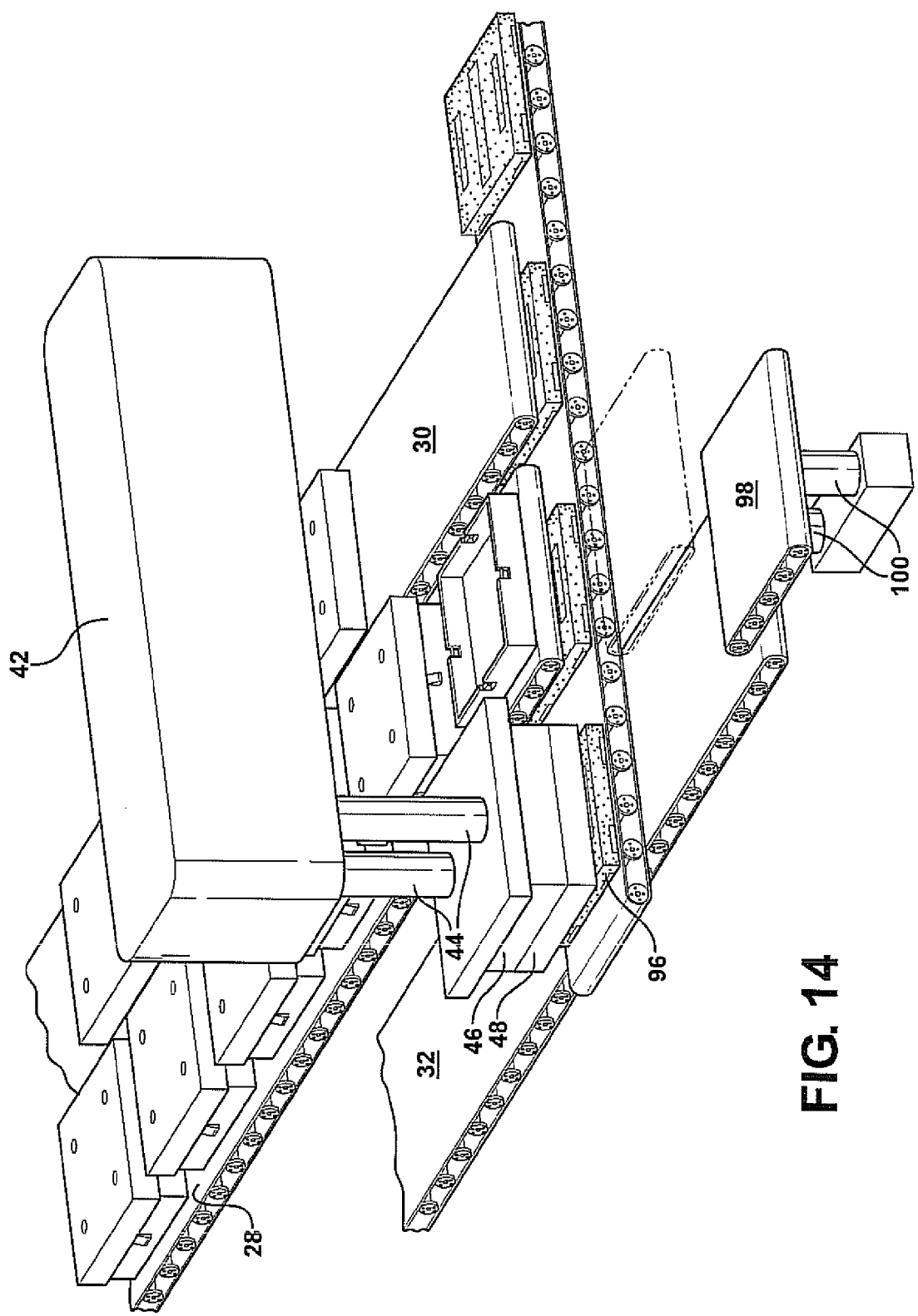
FIG. 14 is a succeeding illustration to that shown in FIG. 13 and by which output lift and transfer mechanism deposits a completed pallet upon the output line, concurrent with the lower mold half being redirected to its associated return line via an output side positioned lift.
Figure 15:
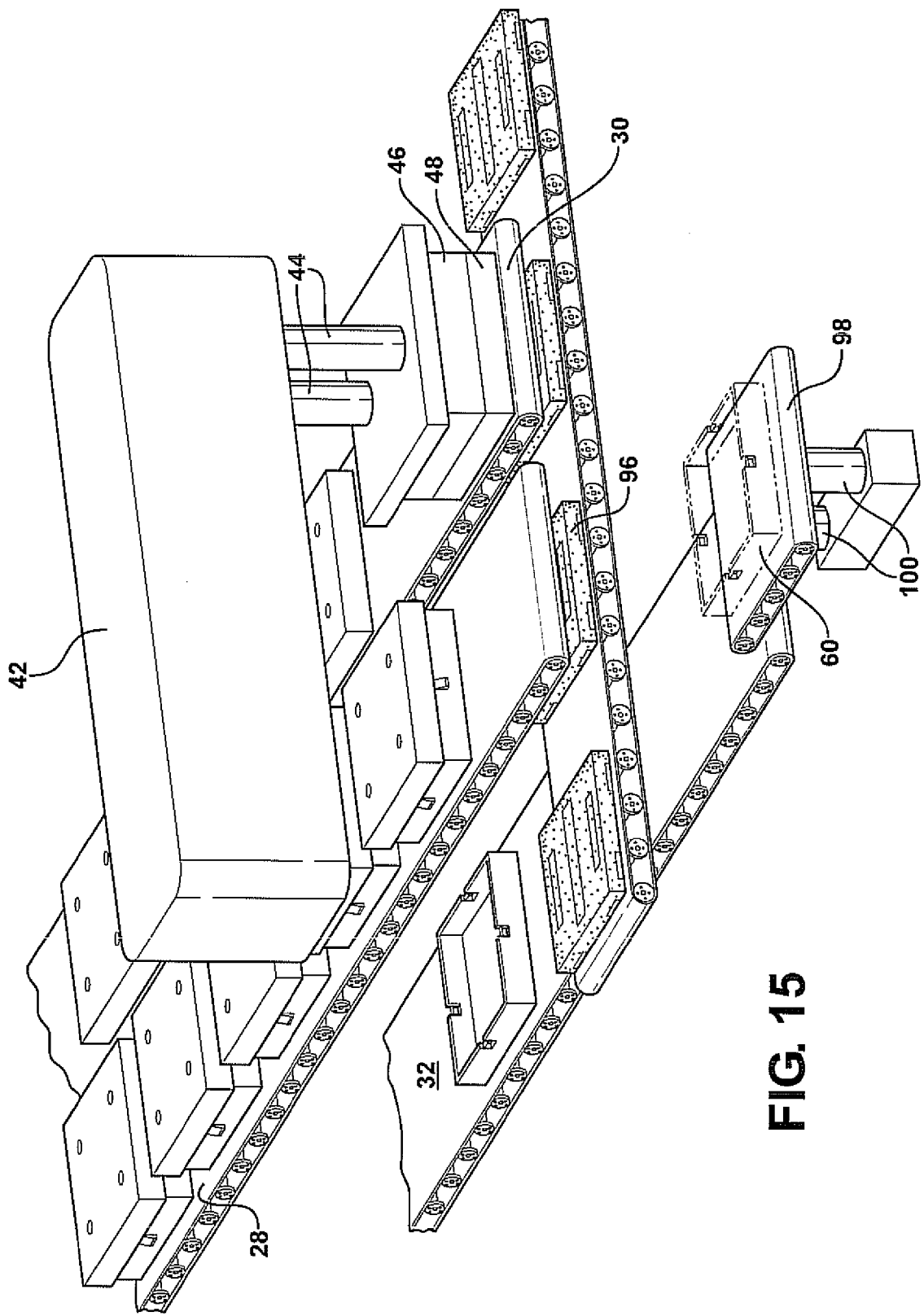
FIG. 15 is a further succeeding illustration of the output lift and transfer mechanism depositing the upper mold half upon an initial position associated with the upper mold half return line.

Referring specifically to FIGS. 10 and 11, the mixing and dispensing station further includes a pair of resin injection ports 102 and 104 associated with communicating resin delivery lines 106 and 108 and which communicate with an interior defined within the previously assembled upper 48 and lower 60 mold halves with the inter-disposed insert 28 and for injecting the two part resin and hardener. Also shown are feed conduits 110 and 112 extending downwardly from the two part resin and hardener chambers 102 and 104 and which mix the components in a common head 114 prior to communicating at a modest pressure into the open mold interior (not shown) and in even fashion about the interiorly supported and suspended insert 28.

In each instance, the assembly process at this point results in equal distribution and adhering application of the curable/settable resin matrix relative to the upper and lower surfaces of the interiorly secured/supported insert. With contrast to the initial embodiment of FIGS. 1-8, the only notable difference is that the mixing and dispensing operation does not occur into the open lower mold half prior to compression assembly of the upper mold half and insert, but rather following the preassembly of the mold halves and in the manner shown in successive views FIGS. 10-12.

A corresponding method for producing a resin coated article, in any quantity, includes the steps of conveying an insert along an input line, conveying an upper mold half and a lower mold half apart from the insert, transporting the upper mold half for assembling there-over the insert in an underside supported and spatially positioned fashion within the upper mold half, assembling the upper mold half and insert with the lower mold half, filling an interior volume defined by the mold halves and insert with a viscous and curable resin either prior or subsequent to assembling the mold halves. Additional steps include conveying the assembled and filled mold along an assembly line concurrent with setting and curing the resin about the insert to create the resin coated article, retrieving the upper mold half and resin coated article from the lower mold half, depositing the resin coated article upon an output line, and rerouting the upper and lower mold halves along separate return lines for subsequent reassembly.

Other steps include the assembling of the upper mold half and insert further including the step of engaging first and second pluralities of clips established between perimeter edges of the insert and interior and opposing facing edges of the upper mold half, injecting resin and hardener components within an open interior of the lower mold half and prior to assembling the upper mold half and insert. Other steps include applying a compressive force to the assembled upper and lower mold halves to equally distribute the resin and hardener components equally along upper and lower surfaces of the inter-disposed insert, injecting resin and hardener components within a previously closed mold established by the assembling of the upper and lower mold halves for equal distribution along upper and lower surfaces of the inter-disposed insert, transporting the upper mold halves to an upper mold half return line following depositing of the resin coated article upon the output line and, lowering the lower mold half from an outlet location of said assembly line for return transport along a lower mold half return line, followed by elevating the lower mold half for re-delivery to an inlet end of said assembly line.

Having described my invention, other and additional preferred embodiments will become apparent to those skilled in the art to which it pertains, and without deviating from the scope of the appended claims.

I claim:

1. A production assembly for mass producing a plurality of resin coated articles, comprising:
    an input line upon which is transported a plurality of rigid and planar shaped inserts;
    an output positioned in line a spaced relationship from said input line for removing the resin coated articles;
    at least one mold supporting and closed loop conveyor line extending between said input and output lines, said conveyor line including a mold assembly line and an empty mold return line divided into an upper mold half return line and a lower mold half return line;
    a first lift and transfer mechanism communicable between said input line and said mold assembly line for collecting, in succession, an insert for installation within a series of molds supported upon said assembly line, said molds each further comprising a lower mold half communicated to said lower mold half return line via a vertically displaceable input side located lift and an assembleable upper mold half communicated to said upper mold half return line via said first lift and transfer mechanism, wherein said upper and lower mold halves, upon assembly, collectively defining an interior within which a selected insert is suspended;
    a mixing and dispensing station located at said mold assembly line and communicating with each mold in succession to fill the interior and around said suspended insert within each mold with a viscous and curable resin material, said assembled and filled molds setting while being conveyed at a selected speed along said mold assembly line; and
    a second lift and transfer mechanism communicable between said mold assembly line and said output line for removing the finished articles from the mold for depositing upon said output line concurrent with said empty molds redirected along said return line to said mold assembly line.

2. The assembly as described in claim 1, said first lift and transfer mechanism being positioned in overhead extending fashion between said upper mold half return line, said input line and said mold assembly line, said lift and transfer mechanism further comprising an underside projecting and displaceable carriage movable between a first position for collecting an upper mold half, a second position for collecting and supporting the insert in an underside disposed fashion relative to the upper mold half, and a third position for assembling the upper mold half and insert upon the lower mold half.

3. The assembly as described in claim 2, further comprising a plurality of clips arranged at peripheral edge locations associated with the insert and which are engaged in underside supporting and spatially positioned fashion within the upper mold half by engaging clips defined upon inner recessed side edges associated with the upper mold half and prior to assembly with the lower mold half.

4. The assembly as described in claim 2, said second lift and transfer mechanism being positioned in overhead extending fashion between said assembly line, said output line and said upper mold half return line, said second lift and transfer mechanism further comprising a second underside projecting and displaceable carriage movable between a first position for retrieving the upper mold half and resin coated article from the lower mold half, a second position for depositing the resin coated article upon said output line, and a third position for depositing the upper mold half to upper mold half return line.

5. The assembly as described in claim 4, further comprising an input side lift for rerouting a lower mold half from said lower mold half return line to said mold assembly line, an output side lift rerouting the lower mold half from said mold assembly line to said lower mold half return line.

6. The assembly as described in claim 5, further comprising said lower mold half return line extending in underneath spaced fashion relative to said mold assembly line, said input side lift elevating from a communicating position with said lower mold return line for redirecting a selected lower mold half to an input end of said mold assembly line, said output side lift descending from a communicating position with an output end of said assembly line for redirecting a further selected mold half to said lower mold half return line and following removal of said upper mold half and resin coated article by said second lift and transfer mechanism.

7. The assembly as described in claim 5, further comprising said input side lift communicating with a mold maintenance and repair line for removing a mold from said assembly.

8. The assembly as described in claim 2, said mixing and dispensing station further comprising a pair of injecting ports for depositing resin and hardener components within an open interior of a selected lower mold half located upon said assembly line and prior to said first lift and transfer mechanism assembling the upper mold half and insert upon the lower mold half.

9. The assembly as described in claim 2, said mixing and dispensing station further comprising a pair of ports communicating with an open interior associated with previously assembled upper and lower mold halves with inter-disposed insert and for injecting resin and hardener components.

10. The assembly as described in claim 1, said assembly further comprising a plurality of mold supporting and closed loop conveyor lines extending in spaced apart fashion between said input and output lines.

11. A production assembly for mass producing a resin coated pallet, comprising:

an input line upon which is transported a plurality of rigid and planar shaped inserts;

an output line positioned in a spaced relationship from said input line for removing the resin coated articles;

a plurality of mold supporting and closed loop conveyor lines extending between said input and output lines, said conveyor lines including a mold assembly line and an empty mold return line divided into an upper and a lower mold half return line;

a first lift and transfer mechanism communicable between said input line, a selected one of said return lines, and said mold assembly line for collecting, in succession, an insert and an upper mold half for installation upon a lower mold half, said lower mold half communicated to said lower mold half return line and redirected to said assembly line via a vertically displaceable input side located lift, said insert being positioned between said upper and lower mold halves within an interior defined therebetween by a plurality of clips arranged at peripheral edge locations associated with said insert and being engaged in underside supporting and spatially positioned fashion within said upper mold half by additional engaging clips defined upon inner recessed side edges associated with said upper mold half so that said upper and lower mold halves, upon assembly, collectively define an interior within which said insert is suspended;

a mixing and dispensing station located at said mold assembly line and communicating with each mold in succession to fill the interior and around said suspended insert within each mold with a viscous and curable resin material, said assembled and filled molds setting while being conveyed at a selected speed along said mold assembly line; and a second lift and transfer mechanism communicable between said mold assembly line, said output line and said upper mold half return line for removing, in succession, the upper mold half with resin coated pallet, depositing the pallet upon said output line, and depositing the upper mold half upon said upper mold half return line concurrent with redirecting the lower mold half from said assembly line to said lower mold half return line.

* * * * *